United States Patent [19]

Hatfield

[11] Patent Number: 4,592,253
[45] Date of Patent: Jun. 3, 1986

[54] APPARATUS FOR PREPARING THE END OF A SHIELDED FLAT CABLE

[75] Inventor: John G. Hatfield, Camp Hill, Pa.

[73] Assignee: AMP Incorporated, Harrisburg, Pa.

[21] Appl. No.: 728,722

[22] Filed: Apr. 30, 1985

[51] Int. Cl.$^4$ ............................................. H02G 1/12
[52] U.S. Cl. ..................................... 81/9.51; 81/9.41; 83/924; 30/90.6
[58] Field of Search .................... 81/9.4, 9.51, 9.41, 81/9.42; 83/924, 925 R; 29/828, 426.1, 426.2; 30/90.1, 90.4, 90.6

[56] References Cited

U.S. PATENT DOCUMENTS

| | | | |
|---|---|---|---|
| 3,316,781 | 5/1967 | Bignell et al. | 81/9.51 |
| 3,621,560 | 11/1971 | Bright | 29/828 |
| 3,774,478 | 11/1973 | Carpenter et al. | 81/9.51 |
| 4,120,217 | 10/1978 | Rodd et al. | 81/9.51 |
| 4,394,828 | 7/1983 | Garbis et al. | 81/9.51 |

OTHER PUBLICATIONS

Research Disclosure, No. 111, Jul. 1973, Portable Tool for Removing the Covering and Protective Layer of a Heavy Electric Cable, 11145.

Primary Examiner—Roscoe V. Parker
Attorney, Agent, or Firm—F. Brice Faller

[57] ABSTRACT

Apparatus comprises a clamp to fix flat cable against axial movement relative to a strip slide plate which is moved rearward relative to stripping blades by a pneumatic cylinder. This strips insulative jacket from free end of cable engaged by blades to expose foil shield. Another pneumatic cylinder causes blades to retreat from path of cable, and another pneumatic cylinder advances stripped end so that edges thereof closely enter mutually facing arcuate channels in laterally spaced guides. Channels have respective first portions profiled to receive edges of the jacket closely therein, second portions profiled to receive edges of the exposed shield therein, and respective shoulders between each first and second portion. A pair of opposed rotary cutting blades extend through slots in respective channels so that arcs of blades are initially exposed only in second portions of channels. Further advance of cable after jacket abuts shoulders moves guides relative to blades until arcs extend into first portions to cut shield to jacket.

3 Claims, 11 Drawing Figures

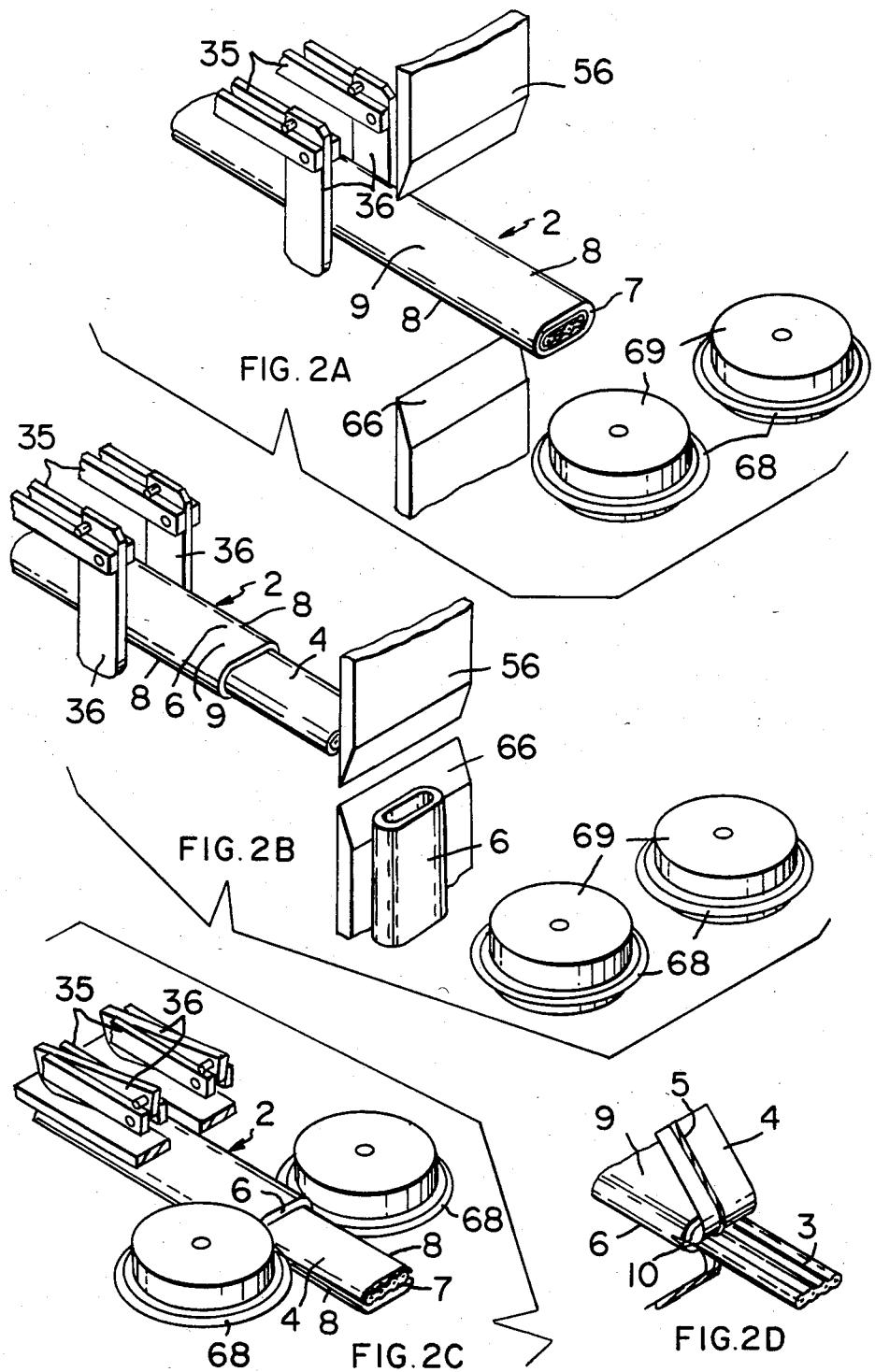

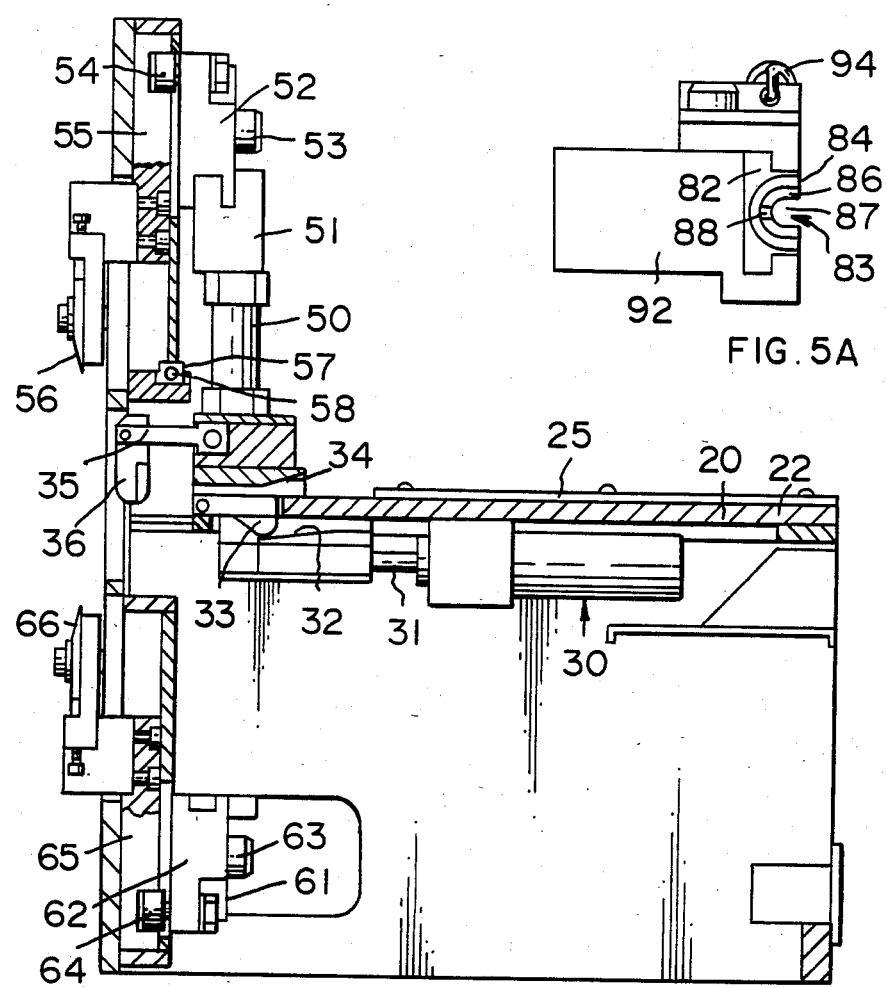
FIG. 5A
FIG. 3
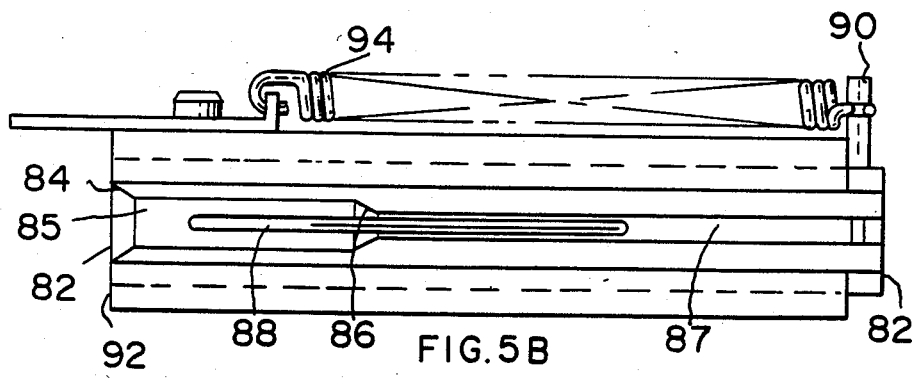
FIG. 5B

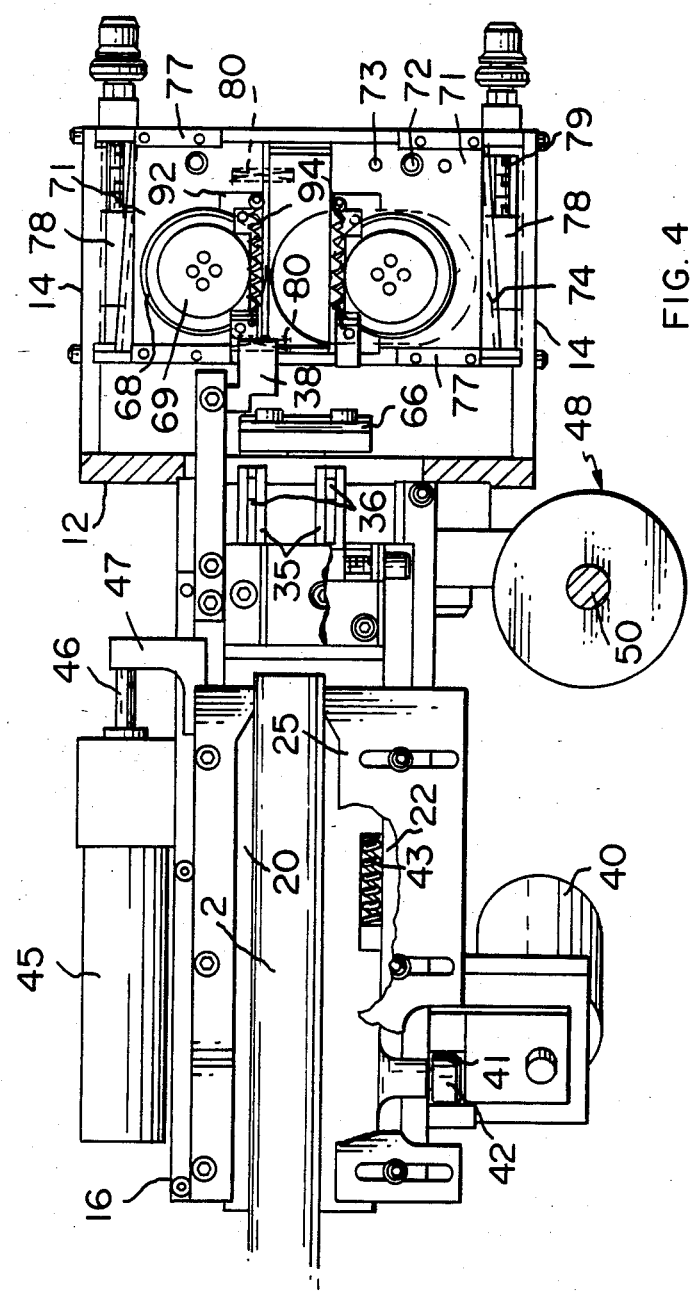

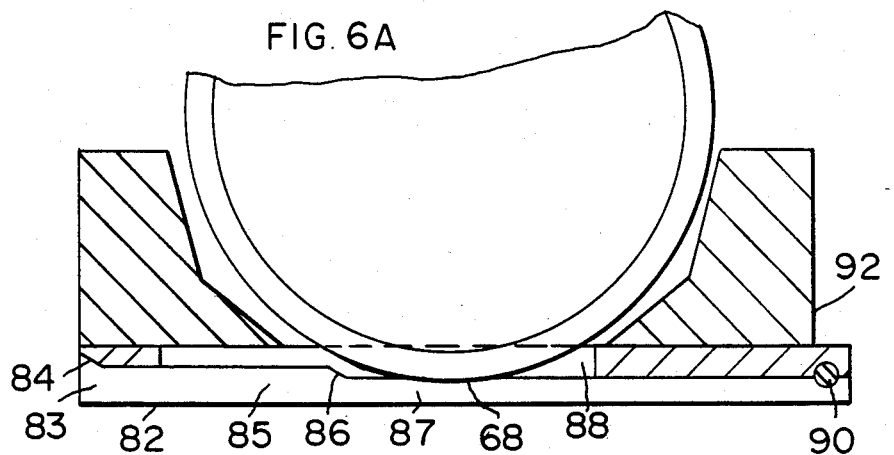
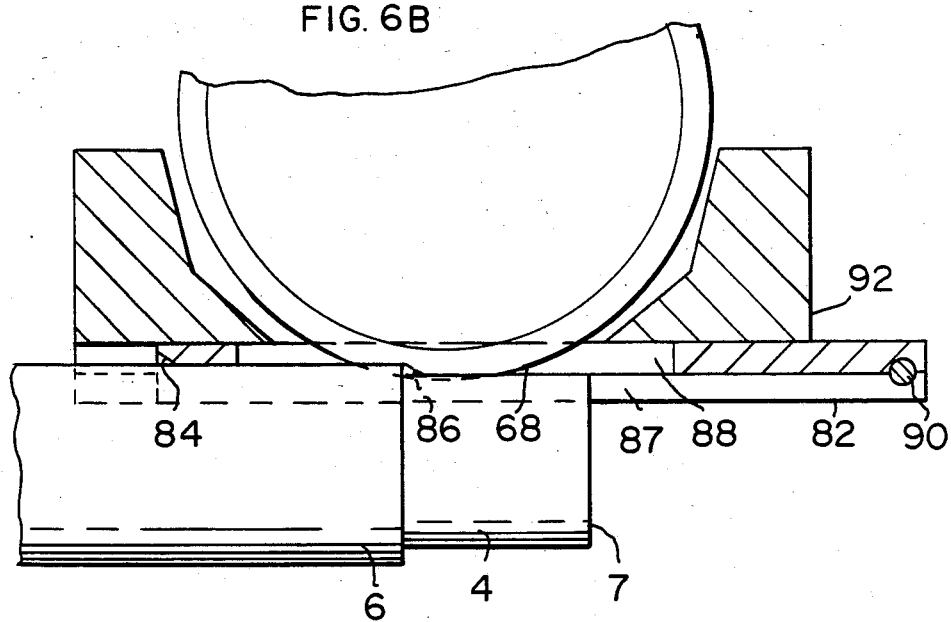

APPARATUS FOR PREPARING THE END OF A SHIELDED FLAT CABLE

BACKGROUND OF THE INVENTION

The present invention relates to apparatus and method for stripping the outer jacket from the end of a shielded flat cable and for slitting the shield so it can be folded back for termination to a connector shield.

U.S. Pat. No. 4,457,575 discloses a modular plug having a shield to protect against interference and static discharge at the interface with a shielded flat cable. Such a plug is sold by AMP Incorporated as its Shielded Data Link or SDL connector. Its primary usage is in computers, computer peripherals, video games, point of sale equipment, and process control equipment. To prepare the cable for termination, the outside insulative jacket at the end of the cable is stripped away and the shield is rolled or folded back against the outside jacket where it contacts an extension of the connector shield in the cable receiving opening of the plug.

A known method of preparing a shielded flat cable for termination entails first removing the outside jacket proximate the end of the cable using a stripping tool such as that described in U.S. Pat. No. 3,774,478. The exposed conductive shield is then cut manually on opposite edges of the cable and folded back against opposed flat surfaces of the cable. This method, while effective, is quite time consuming.

U.S. Pat. No. 4,538,487 discloses apparatus employing rotary cutting blades to simultaneously slit both the outside jacket and the shield on opposed edges of a cable, and subsequently removing the jacket from opposed sides in two slugs. Variations in thickness of the outside jacket often lead to cutting well into the insulation around the conductors inside the foil, which is not acceptable in many applications.

SUMMARY OF THE INVENTION

The present invention relates to apparatus which first removes the outer jacket of insulation from the free end of the cable to expose the shield therein. The end is then advanced into guides having arcuate channels which closely receive the cable therebetween. Small arcuate sections of counterrotating rotary cutting blades are exposed in the channels to slit the shield along its edges. Since an outer jacket of variable thickness is not being cut simultaneously, the depth of blade penetration in the foil may be precisely controlled to assure the inner insulation is not cut to any appreciable depth.

The opposed guide channels are each in two portions, the first profiled to closely accommodate the edges of the jacket, the second profiled to closely accommodate the edges of the exposed shield. The rotary blades initially impinge into the second portion, so that the stripped end of the cable is closely contained as it enters that stage. When the jacket hits a shoulder between the first and second portions, the guides move relative to the blades so that the exposed arcs extend into the second portion sufficiently so that the shield is slit all the way to the outer jacket. This assures that it will not be necessary to tear the shield when opposite sides are folded against the jacket, which tearing is not predictable but generally migrates from the side edges, which decreases the continuity of contact between the shields on the cable and the connector.

BRIEF DESCRIPTION OF THE DRAWINGS

FIGS. 2A, 2B and 2C are diagrammatic perspectives depicting the sequence of operations on the cable.

FIG. 2D is a perspective of the prepared cable.

FIG. 3 is a side section of apparatus.

FIG. 4 is a plain view of the apparatus.

FIG. 5A is a partial end view of the cable guide.

FIG. 5B is a side view inside of the cable guide.

FIG. 6A is a partial top section view of the guide prior to cable insertion.

FIG. 6B is a partial top section view of the guide after cable insertion.

DETAILED DESCRIPTION OF THE PREFERRED EMBODIMENT

Figure 1:
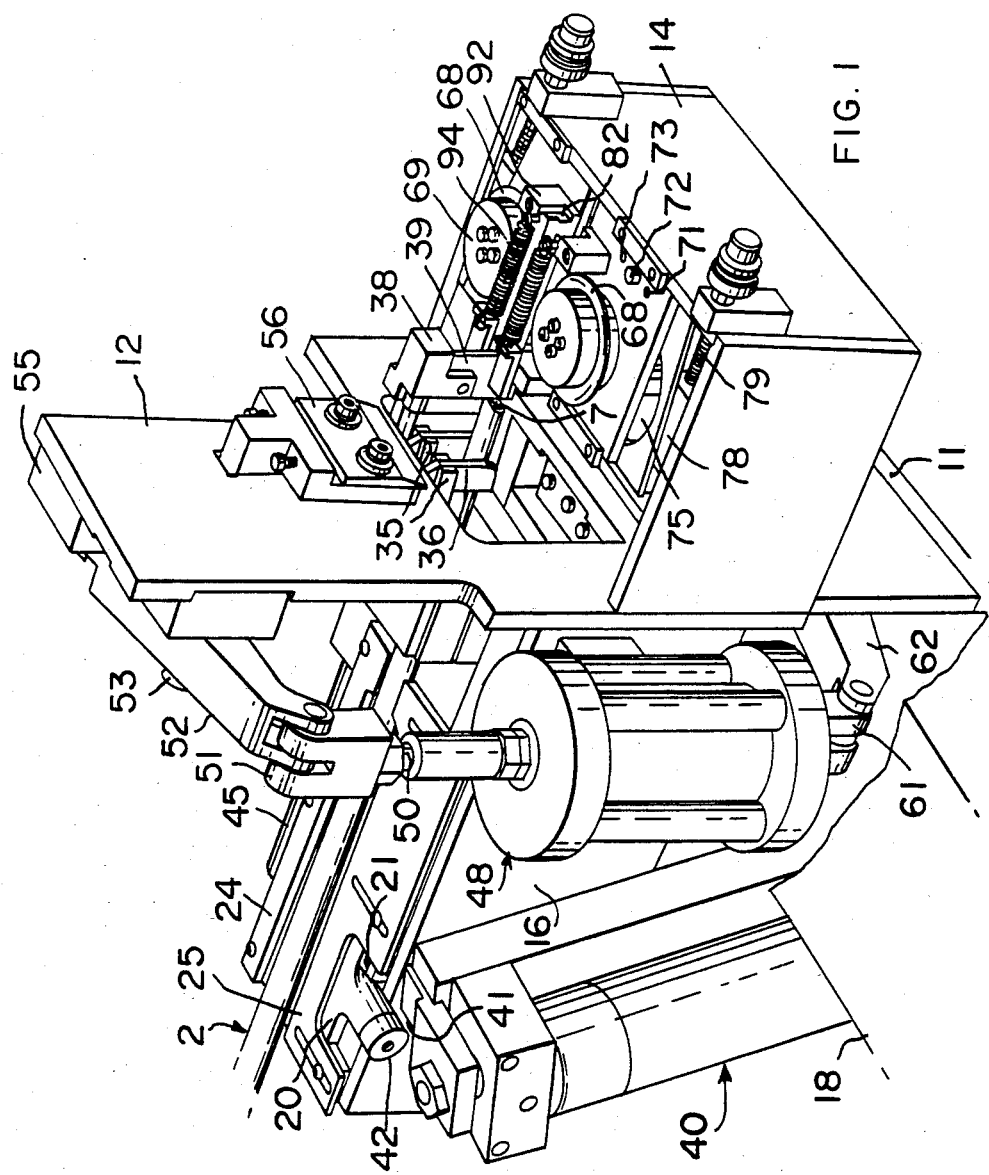
FIG. 1 is a perspective of the cable preparation apparatus.

Referring to FIG. 1, apparatus comprises a base 11, a main vertical plate 12 upstanding therefrom, a forward box frame 14, and a rearward box frame 16. A flat shielded cable 2 is placed between guide plates 24, 25 on top of strip slide plate 20 and pushed forward between guides 36 until the free end 7 abuts sensing finger 39 as shown. Upper strip blade 56 is fixed relative to upper strip slide 55 which is gibbed for vertical movement on the opposite side of plate 12. Air cylinder 48 drives rod 50 and clevis 51 upward to pivot arm 52 about pivot 53 to effect downward movement of slide 55, and simultaneously drives clevis 61 downward to pivot arm 62 to move a lower blade 66 (FIG. 3) upward. The cable 2 is clamped by means to be discussed and pulled rearward by the action of air cylinder 40, which drives a cam 41 against follower 42. Slitting of exposed cable shield is subsequently accomplished by rotary cutting blades 68 as the cable is received in guide 82 which is gibbed for sliding movement in gibs 92 against the action of springs 94.

The sequence of operations on the cable 2 is depicted schematically in FIGS. 2A, 2B, and 2C. The cable 2 having a free end 7, opposed side edges 8, and opposed external surfaces 9 is received between guides 36 hanging from respective arms 35. It extends between strip blades 56, 66, which close to penetrate the cable jacket 6, a slug of which is pulled free by rearward movement of the cable to expose foil shield 4, as shown in FIG. 2B. Referring to FIG. 2C, the cable 2 is then advanced between rotary cutting blades 68 which rotate to slit just the foil shield 4 on opposite edges 8. The blades 68 slit the foil 4 all the way back to outside jacket 6, so that the foil can be folded back toward opposed external surfaces 9 as shown in FIG. 2D. In order to slit the foil to the jacket with rotary blades it is necessary to cut slits 10 in jacket 6. If this is not done, the foil could be torn irregularly when drawn back as shown.

FIG. 3 is side section taken along a vertical plane through rear box frame 16 between plates 24, 25 (FIGS. 1 and 4). Air cylinder 30, fixed to the underside of strip slide plate 20, drives a cam 32, fixed on the end of rod 31, against lower clamp 33, which is pivoted in plate 20. This clamps a cable against upper clamp 34, which has a chamfered lead-in to facilitate cable reception between clamps 33, 34, after the cable is received between chamfered guides 36, which hang from arms 35. The arms 35 are fixed relative to strip slide 20 for movement therewith. The strip slide 20 moves rearward relative to slit slide 22 therebelow during stripping as will be described in conjunction with FIG. 4, yet remains stationary relative to slide 22 during forward movement thereof for slitting the foil.

Referring still to FIG. 3, the remainder of the stripping mechanism described briefly in conjunction with FIG. 1 is here apparent. Arms 52, 62 mounted on respective pivots 53, 63 have followers 54, 64 on ends thereof. The followers ride in slots in respective slides 55, 65 to urge the blades 56, 66 toward each other to impinge the outer jacket on a flat shielded cable positioned therebetween. The distance between the blades 56, 66 when closed must be precisely controlled to assure that the jacket is penetrated as fully as possible without damaging the foil shield. Accordingly, a vernier calibration in the form of a wedge shaped stop 57 on a screw 58 is provided to limit downward travel of upper slide 55 as desired.

FIG. 4 shows a cable 2 positioned between guide plates 24, 25 on strip slide 20 before the cable is fully advanced to sensing block 38. The position of right side guide plate 25 is adjustable laterally to accommodate cables of different widths. Once the cable 2 is fully advanced, clamped, and impinged by the strip blades (FIG. 3), cylinder 40 urges cam 41 upward to bear against follower 42 to urge plate 20 rearward to strip the cable fixed thereagainst. Air pressure is then released from cylinder 40 and spring 43 effects return of the plate 20 as the strip blades retreat. Air cylinder 45, fixed to frame 16, is pressurized to urge block 47 fixed to the end of rod 46 forward. The block 47 is fixed to slit slide 22, and urges the slides 20, 22, guides 36, and sensing block 38 forward as a unit until the blades 68 impinge the cable as shown in FIG. 2C. The blades 68 are held by clamps 69 which are rotated in opposite directions by electric motors suspended below mounting plates 71. Each mounting plate 71 is fixed to a respective base plate 74 therebelow, the base plates 74 being gibbed for sliding movement between cover plates 77 and the frame 14. The mounting plate 71 can be repositioned to accommodate different cable sizes by removing pin 72 and repositioning the plate 71 in alignment with another hole in base plate 74 therebelow. The aperture 75 will accommodate the drive motor therein in several positions. Fine adjustment of the distance between blades 68 is provided by wedges 78 between opposed faces of respective base plates 74 and the adjacent vertical plates of frame 14. The wedges receive fine threaded vernier screws 79 so that rotation thereof moves respective plates 74 in small increments. The plates 74 are urged apart by compression springs 80 therebetween.

FIG. 5A is an end view and FIG. 5B is a side view of cable guide 82, which is carried slidably in a gib 92 fixed to a respective mounting plate 71. There are two such guides 82, each being the mirror image of the other, the two receiving the stripped end of a shielded flat cable therebetween. Each guide 82 has an arcuate channel 83 profiled therein, each channel having a lead-in 84, a first portion 85 profiled to receive an edge of the cable jacket closely therein, a second portion 87 profiled to receive the edge of the exposed shield therein, and a shoulder 86 between portions 85, 87 which acts as a lead-in to the second portion 87 and further serves as a stop for the end of the jacket. Each channel 83 has an elongate slot 88 therein in the deepest portion thereof, the slot extending between portions 85, 87 and receiving the cutting edge of a rotary cutting blade 68 therein to expose a small arc thereof in the channel. A tension spring 94 fixed at one end to the top of gib 94 and at the other end to a post 90 fixed in the guide 82 returns the guide 82 when moved relative to the gib 92.

FIG. 6A is a plan view of the guide 82 in gib 92 before insertion of a stripped cable. An arc of blade 68 is exposed only in the second portion 87 of channel, so that the stripped end of the cable will be closely received before any edge slitting begins.

FIG. 6B shows the cable 2 fully inserted, the jacket 6 abutting shoulder 86 to slide the guides 82 relative to gibs 92 until the edges of shield 4 are slit all the way to jacket 6. This movement is effected by a cylinder 45 (FIG. 4) against the action of springs 94 (FIGS. 1, 4, 5B), which return the guides 82 when air pressure is released.

The foregoing is exemplary and not intended to limit the scope of the claims which follow.

I claim:

1. Apparatus for preparing the end of a shielded flat multiconductor cable for termination, the cable comprising a plurality of side-by-side insulated conductors surrounded by a conductive shield which is surrounded by a continuous insulative outside jacket, the cable having opposed side edges and opposed external surfaces extending therebetween, the apparatus comprising a base, a pair of coplanar rotary cutting blades mounted for rotation on respective axes which are fixed relative to said base, said blades being spaced to impinge opposed side edges of said shield when said cable is passed therebetween, cable guide means between said blades comprising a pair of parallel mutually facing elongate arcuate channels profiled to closely receive respective side edges of said cable on a first path therein, each said channel having a lead-in, a first portion proximate said lead-in profiled to receive an edge of the jacket closely therein, a second portion remote from said lead-in profiled to receive the edge of the shield therein, and a shoulder between said portions which acts as a lead-in to said second portion and further serves as a stop for the end of the jacket, each said channel having an elongate slot therein in the deepest part thereof, the edges of said rotary cutting blades protruding through said slots at a first position and into respective second portions of said channels only sufficiently to cut through said shield said guide means being movable relative to said base parallel to the cable axis so that said cutting blades protrude through said slots at a second position and into said first portions adjacent said shoulders, whereby upon moving said free end of a cable having the outside jacket stripped therefrom to expose the shield between the end of the jacket and the free end of the cable into said lead-in until said end of said jacket abuts said shoulder while said blades protrude through respective slots at said first position, and upon further moving said cable so that said guide moves until said blades protrude through respective slots at said second position, said blades will cut the side edges of said shield to the end of said jacket.

2. Apparatus as in claim 1 further comprising
    a pair of opposed stripping blades reciprocable perpendicularly relative to said base, said blades engaging said cable jacket when said cable is on said first path, clamping means effective to clamp said cable on said first path, means to move the clamp means rearward on said first path to pull said cable from said strip blades to strip the jacket from the free end, means to advance the clamp means toward the guide means to insert the stripped free end therein.

3. Apparatus as in claim 1 wherein said guide means comprises a pair of parallel guides having respective channels therein, said guides being movable laterally relative to each other, whereby different width cables may be accommodated.

* * * * *